Figure 1:
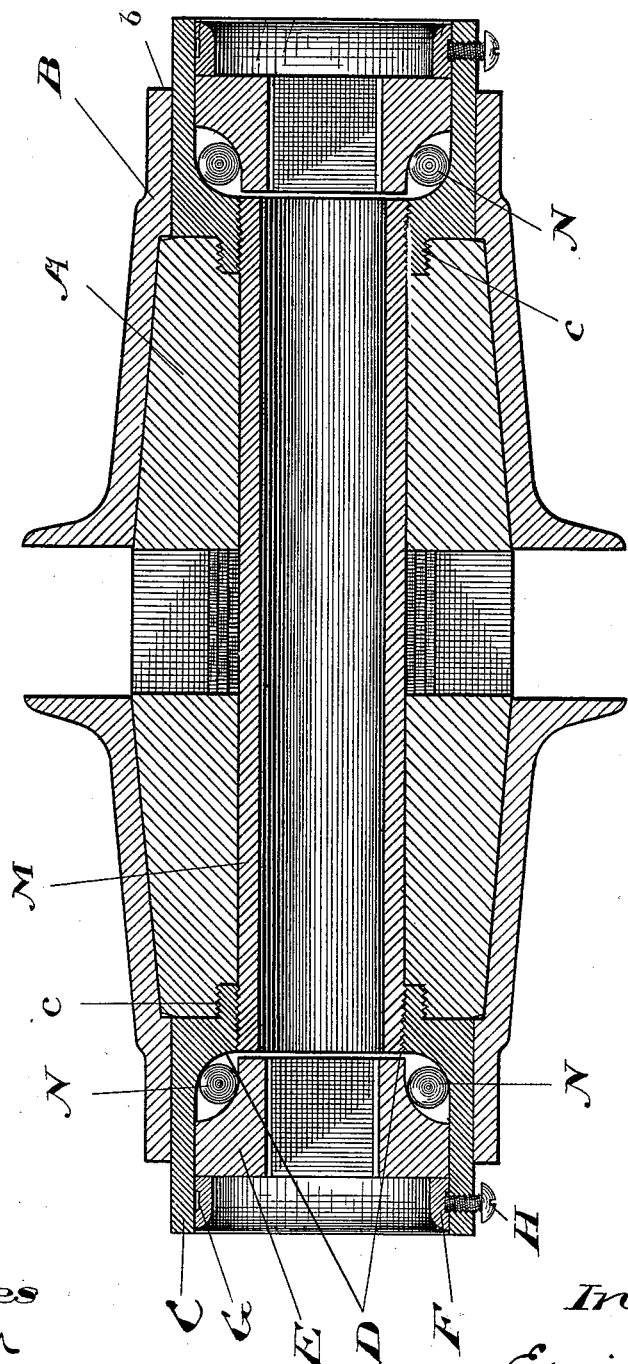

(No Model.)　　　　　　E. F. MOORE.　　　2 Sheets—Sheet 1.
ANTIFRICTION WHEEL HUB.

No. 520,933.　　　　　　　　　　Patented June 5, 1894.

Witnesses
J. E. Cameron
L. Foulds

Inventor
Edwin F. Moore
by C. H. Riches
his atty

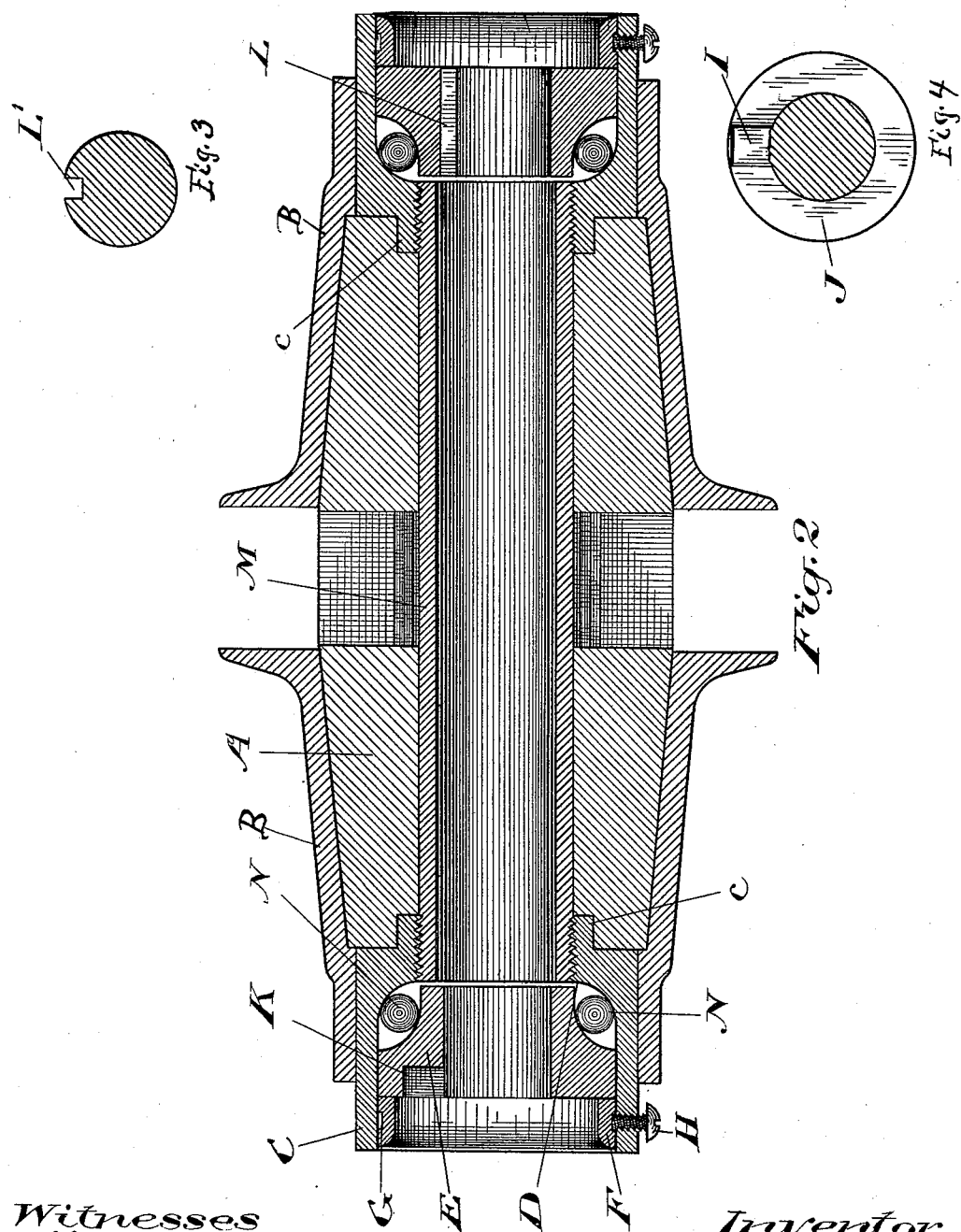

UNITED STATES PATENT OFFICE.

EDWIN F. MOORE, OF TORONTO, CANADA.

ANTIFRICTION WHEEL-HUB.

SPECIFICATION forming part of Letters Patent No. 520,933, dated June 5, 1894.

Application filed February 23, 1894. Serial No. 501,447. (No model.)

*To all whom it may concern:*

Be it known that I, EDWIN F. MOORE, of the city of Toronto, in the county of York and Province of Ontario, Canada, have invented certain new and useful Improvements in Antifriction Wheel-Hubs; and I hereby declare that the following is a full, clear, and exact description of the same.

This invention relates to certain new and useful improvements in wheel hubs, and the object of the invention is to provide a wheel hub having ball bearings at each end with a sleeve or boxing located within the bore of the hub, and adapted to couple together the said bearings and prevent the lubricant for the bearings getting within the bore of the hub; and the invention consists essentially of the device hereinafter set forth and more particularly pointed out in the claim.

In the drawings: Figure 1 is a cross sectional view of a vehicle hub showing my improvement used in conjunction with a square axle. Fig. 2 is a cross sectional view showing my improvement used in conjunction with a round axle. Fig. 3 is a cross sectional view of the axle at or near the end. Fig. 4 is a cross sectional view of the axle showing the dust collar and spline or key at the inner end of the axle arm.

Like letters of reference refer to like parts throughout the specification and drawings.

The improvements as shown in the drawings have been applied to a vehicle hub, but the same improvements are also applicable to any other class of wheel.

In Figs. 1 and 2 it will be noticed that encircling each end of the hub A is a collar B, and that each of the collars B projects beyond its respective end of the hub. Fitted within the outer end $b$ of each of the collars B is a bearing case C. The inner end of each of the bearing cases C is partially closed by an annular conical portion D, which may either be formed integrally with or subsequently fitted to the bearing case. Within each bearing case C is a coned bearing E revolubly locked within the bearing case C by means of a ring F having a circumferential groove G to receive the stem of a set screw H. The opening or bore through each coned bearing E shown in Fig. 1 is square, while the opening or bore through each coned bearing shown in Fig. 2 is round.

I do not confine myself to any particular shaped opening through each coned bearing, as I may employ any shaped opening that is found convenient for my purpose. The object of the square shaped opening through each coned bearing shown in Fig. 1 is to permit a correspondingly shaped axle to hold the coned bearings immovably upon it.

The coned bearings shown in Fig. 2 are each provided with a round opening, and to lock together the coned bearing and the axle I have provided that part of the axle A' immediately contiguous to the dust collar J with a spline or key I, and have provided the coned bearing at the adjacent end of the hub with a correspondingly shaped seat K, into which may enter the spline or key I to immovably and separately lock together the coned bearing and the axle, and I have provided the inner surface of the coned bearing adjacent to the outer end of the axle with a spline or key L to enter a correspondingly shaped seat L' in the adjacent end of the axle, or I may provide, if desirable, the coned bearing with a flattened surface to rest upon a correspondingly flattened surface on the adjacent end of the axle, thus immovably and separably locking the coned bearing at each end of the hub to the axle. I may, however, lock the coned bearing at the adjacent end of the hub to the dust collar J instead of to the axle, by means of a similar spline or key, secured either to the coned bearings or to the dust collar, which spline or key enters a corresponding seat provided for it in either the dust collar or the coned bearing or I may lock the coned bearings to the hub by varying the adjacent surfaces of each from a true circle sufficiently to prevent the one revolving without the other.

Within the bore of the hub is a sleeve or boxing M. As shown in Fig. 1 of the drawings this sleeve or boxing M is screw-threaded at each end, and it will be noticed also by reference to the drawings that a bearing case is screwed on each end of the said sleeve. This sleeve holds the bearing cases in their proper relation to their relative parts of the hub, and in addition to holding the bearing cases in their proper relation also strengthens the relative parts of the hub and prevents the lubricant for the ball bearings entering the bore of the hub. With a slight alteration it is possible to employ these ball bearings and sleeve or boxing in conjunction with a cycle wheel. Each of the coned bearings is provided with a bearing surface, and each of the bearing cases is provided with a corresponding bearing surface, upon which bearing surfaces run the balls N. The sleeve it will be understood is free of contact at all times with the axle, in order that the hub can revolve freely about the axle.

By reference to the drawings it will be noticed that formed integrally with each bearing case C is a diminished collar $c$, and by reference to Fig. 1 it will be noticed that the outer surface of the collar $c$ is screw-threaded to engage with a screw threaded recess in its respective end of the hub A. The inner face of the collar $c$ and bearing case C is also screw threaded to engage with the screw threaded surface of the sleeve or boxing M, in order, in the first place, that the bearing case can be screwed into its respective end of the hub, and in the second place that the boxing can be screwed into the bearing cases and collars. A bearing case provided with a collar similar to the one shown in Fig. 1 of the drawings can be screwed into its respective end of a metal hub, and by that means securely lock thereto.

Having thus fully described my invention, what I claim as new, and desire to secure by Letters Patent, is—

The combination of the hub, a metallic sleeve within the bore of the hub screw threaded at each end, a bearing case fitted to each end of the hub, each of said bearing cases screwed on its respective end of the sleeve, a coned bearing within the bearing case, the balls, a ring removably fitted to the bearing case and arranged to lock the coned bearing within the bearing case, a spline or key fitted to the inner surface of the coned bearing adjacent to the outer end of the axle, to enter a correspondingly shaped seat in the said end of the axle, the axle provided with a spline or key contiguous to the dust collar, to enter a correspondingly shaped seat in the adjacent bearing case, substantially as and for the purpose specified.

Toronto, February 13, 1894.

EDWIN F. MOORE.

In presence of—
   C. H. RICHES,
   D. HOOEY.